United States Patent [19]
Carroll et al.

[11] Patent Number: 6,142,554
[45] Date of Patent: Nov. 7, 2000

[54] SLIDING BOW DUMP TRUCK COVER

[75] Inventors: Ronald D. Carroll, Littleton; Jeffry A Hubbard, Northglenn, both of Colo.

[73] Assignee: Truckhugger Tarp Systems, Inc., Aurora, Colo.

[21] Appl. No.: 09/272,219

[22] Filed: Mar. 18, 1999

[51] Int. Cl.[7] .................................................. B60P 7/02
[52] U.S. Cl. ........................ 296/100.12; 296/100.11; 296/104; 296/100.13; 298/17.7; 298/13
[58] Field of Search ......................... 296/100.11, 100.13, 296/104, 105; 298/17.7, 13, 23 C

[56] References Cited

U.S. PATENT DOCUMENTS

| | | | |
|---|---|---|---|
| 667,475 | 2/1901 | Winter et al. | |
| 1,770,503 | 7/1930 | Williams | 296/100.11 |
| 1,792,789 | 2/1931 | Williams | |
| 2,443,478 | 6/1948 | Reid | 296/100 |
| 2,757,042 | 7/1956 | Schultz | 296/100 |
| 2,807,499 | 9/1957 | Duddleston | 296/100 |
| 3,481,645 | 12/1969 | Stepp | 296/105 |
| 3,942,830 | 3/1976 | Woodward | 296/105 |
| 3,964,781 | 6/1976 | Fenton | 296/100.13 |
| 4,032,186 | 6/1977 | Pickering et al. | 296/100.13 |
| 4,067,603 | 1/1978 | Fenton | 296/100 |
| 4,215,897 | 8/1980 | Aiken et al. | 296/100 |
| 4,289,346 | 9/1981 | Bourgeois | 296/105 |
| 4,725,090 | 2/1988 | Weaver | 296/100.11 |
| 4,801,171 | 1/1989 | Weaver | 296/100.11 |
| 4,858,984 | 8/1989 | Weaver | 296/100.11 |
| 4,948,193 | 8/1990 | Weaver | 296/100.11 |
| 4,995,663 | 2/1991 | Weaver et al. | 296/100.11 |
| 5,102,182 | 4/1992 | Haddad | 296/100.13 |
| 5,112,097 | 5/1992 | Turner, Jr. | 296/100 |
| 5,145,230 | 9/1992 | Biancale | 296/100.13 |
| 5,240,304 | 8/1993 | Cramaro et al. | 296/100 |
| 5,253,914 | 10/1993 | Biancale | 296/100.13 |
| 5,338,084 | 8/1994 | Wardell | 296/105 |
| 5,524,953 | 6/1996 | Shaer | 296/100 |
| 5,873,210 | 2/1999 | Brumleve | 296/104 |
| 5,938,270 | 8/1999 | Swanson et al. | 296/100.11 |

FOREIGN PATENT DOCUMENTS

361487  10/1959  Switzerland.

*Primary Examiner*—Joseph D. Pape
*Assistant Examiner*—Kiran Patel
*Attorney, Agent, or Firm*—Rick Martin; Patrnt Law Offices of Rick Martin, P.C.

[57] ABSTRACT

This invention is directed to a bow end used for sliding bow covering systems which utilizes a solid trolley rail or trolley rail cables or cable or tubular track, trolley wheels and a trolley base having a bow support. The trolley rails or cables are attached to each side of any open top unit or the track is attached along the side. The trolley bow end rides on the trolley rail or in the track without touching the trailer. The important difference in this concept is that the roller wheels are located substantially below the horizontal line of the top of the trailer unit, this allows for side delivery of the contents of the trailer without allowing the contents to effect the trailer trolley rails or cable. Also an extension for storing the bows and tarp in the open position extends out either the front or back end, thus not interfering with the open top of the dump unit. The unit is designed for use with any open to dump box.

22 Claims, 12 Drawing Sheets

SLIDING BOW DUMP TRUCK COVER

FIELD OF INVENTION

The present invention relates to safety systems for covering cargo with a tarp during transport and quickly uncovering the cargo for dumping and fill operations, even applying to side dumpers as well as end dumpers.

BACKGROUND OF THE INVENTION

To date there are no tarp systems that work well on the unique side dump trailers. Side dump trailers actually dump their load from either side of the trailer. This unique feature prevents the use of the typical side to side roll over tarp since this would limit dumping to only one side. No dumping could occur over the stored tarp because the tarp would be destroyed. The existing bow-sliding systems, which move the bows and tarp from front to rear, have cables on each side of the trailer, which would be damaged when the trailer dumps on either side. These bow systems are limited to only rear dump trucks. Also the bows need to slide on the rails for support, and many times the loads carried would prevent this. The bows would have to be stored in front of the trailer, which means the side rails would have to be extended. Far and away the biggest problem with all the bow-sliding covering systems is the fact that the stability of each bow relies on the cable, and the cable is also the point of propulsion. All existing bow-sliding systems work with a cable (or cables). The rear bow is fastened to the cable on each side of the trailer. All other bows have a hole in the bow end that the cable is threaded through. As the cable moves, the rear bow pulls the other bows toward the rear of the trailer by the tarp material. When the cable moves in the opposite direction the rear bow pushes the other bows to the front of the trailer. The cable must slide through the "bow end" of the other bows, but the cable must also be the stabilizing factor that keeps each bow standing upright as it moves to the front or to the rear of the trailer. In order to stabilize the bow (i.e., keep the bow from tilting forward or backward) parts of the bow "lean" on the cable, thereby binding on the cable as it attempts to slide through the bow end. All bow ends on the market today are one and one half to two inches wide, and most bows rise twelve to eighteen inches in the center, and the distance (length of the bow) averages ninety-six inches across. Therefore, you have a ninety-six inch long bow that rises twelve to eighteen inches in the center, and the stabilizing width is only one and one half to two inches. Any tilting of the bow places pressure on the cable in a one and one half to two inch area, and the average trailer will have thirteen to fifteen bows. Jamming occurs frequently in these systems.

A brief summary of the known prior art follows below. U.S. Pat. No. 3,481,645 (1969) to Stepp discloses a hollow track mounted on each side at the top of a dump truck. The top and bottom surfaces of the track support a set of wheels which are mounted on a T shaped carriage. The T shaped carriages support a plurality of bows which carry a tarp. Inside the hollow track is a chain drive mechanism which is powered to open and close the tarp cover over the truck.

U.S. Pat. No. 5,338,084 (1994) to Wardell discloses a flatbed trailer cover system having tracks on the outside top edges of the flatbed. Roller wheels support a base unit which supports bows and a tarp.

U.S. Pat. No. 2,757,042 (1956) to Schultz discloses a tarp support consisting of side mounted tracks which hold the ball end of a rod (5). An opposite end of the rod is tied to the bottom edge of a tarp.

U.S. Pat. No. 5,112,097 (1992) to Turner, Jr. discloses side mounted tracks which support a wheeled trolley which carries the back end of a tarp.

The closest known prior art is Stepp '645. Stepp teaches a sturdy track mounted on each side of the truck to support a trolley which in turn supports bows and a tarp. Stepp uses a chain and pulley system located inside the track to propel the trolleys. The system (nor any system) does not teach extending the tracks beyond the body of the truck to allow full use of all of the open top area in the dump unit. The chains, track and pulleys are prone to collecting dirt since they require lubrication. A dent in the track could easily jam the chain. The system was never commercialized.

The present invention improves the prior art devices by storing the bows in the open mode in an extension rack which can extend forward of the dump unit in rear and side dumpers or rear of the dump unit in side dumpers. Second, a sturdy and simple track and trolley system allows the bows to extend lower down the sides of the dump unit to avoid damage from tractor loading from the side. Third, the simple cable drive system prevents jamming. Fourth, the trolley system, in combination with modular bows, allows bows to be made higher to permit higher payloads in the dump unit.

SUMMARY OF THE INVENTION

The main aspect of the present invention is to provide an extension rack to a dump unit to store the opened bows completely out of the way of the open top of the dump unit.

Another aspect of the present invention is to provide the extension rack on a side dump truck to permit a bow-system to cover a side dumper.

Another aspect of the present invention is to provide a track and trolley mount for the bows which allows mounting the track anywhere on the sides of the dump unit, thereby reducing risk of damage to the track.

Another aspect of the present invention is to provide a simple cable system to power the bows, while stabilization of the bows is a separate factor.

Another aspect of the present invention is to provide a modular bow to provide raising the bow to the desired height.

Other aspects of this invention will appear from the following description and appended claims, reference being made to the accompanying drawings forming a part of this specification wherein like reference characters designate corresponding parts in the several views.

The present invention is improved over the prior art in that the stabilizing factor is no longer the cable, but is a steel rod or track or separate fixed cable that is fastened to both sides of the trailer along the entire length. The bow end in one embodiment consists of a trolley plate consisting of various shapes that has at least three pulley wheels configured in a triangle or rectangle. With two next to each other and one centered above them or four trolley wheels (with bearings) connected to a vertical flat shaft that extends below the wheels and is connected to the bow ends. The four trolling wheel version rides inside a tubular track. The steel rod is located between the two lower pulley wheels and the upper pulley wheel. The bow, which is connected to the plate extends over the width of the trailer to the opposite side and is connected to another plate that is identical to the one just described. The two pulley wheels riding under the steel rod act as an "anti-lift" for each bow preventing the bow from lifting with wind while riding smoothly. The third pulley wheel rides on top of the steel rod creating a firm stabilizing triangle that keeps the bow upright. Every other triangle plate can be inverted with the single pulley wheel below the steel rod and the two pulley wheels above it. This allows for a more compact storage of the bows in front of the trailer.

Located on the backside of each triangle plate is a round washer type hole that allows the cable to move freely through it without binding. The rear bow is permanently connected to the cable so that it moves as the cable moves. The hand crank assembly is located at the front of the trailer (this can be converted to electric). When the cable is cranked, manually or electrically, the rear bow pushes the other bows to the front or pulls them to rear when the cable is cranked in the opposite direction. The other bows move freely without any binding on the cable. When the covering system is fully extended or when it is fully closed, the hand crank locks into place preventing the cover from moving. The four wheel trolley that rides inside a tubular track hangs from the bottom of the track. The bearing wheels allow the bows to slide easily without binding. The bows that tilt do not cause the wheels to bind. The bows are moved the same way as described above.

Another major advantage of the present invention is that the cable and stabilizing rod or track can be located anywhere on the trailer, and the bow can be any shape. All other systems on the market must locate the cable one-inch above the trailer side rail or one inch below the side rail, and the bows must ride on the side rail. This places the cable in harms way of a loader bucket. The present invention is out of harms way and allows the bows to actually go over the side rail without touching the rail. The present invention allows the tarp to extend over past and below the side rail, if need be. Existing systems have a problem of the tarp material gathering under the bow, as it slides along the top rail or rail extension between the bow and side rail. This causes damage to the tarp material, and it also causes additional binding on the cable. The present invention alleviates this problem totally and offers a total waterproof covering, while existing systems only offer semi-water proof covering, and a wind screen is also available.

A summary of the advantages of the present invention are listed below.
1. Bows do touch side rail of dump unit
   a. No catching on the rail
   b. Damaged top rails make no difference to performance
2. Stabilization is separate from propulsion. The present invention uses a track or rod or separate fixed cables for stabilization.
   a. All existing systems depend on the cable for stability. The cable is also the propulsion.
   b. All bows tilt to some degree, and any tilt causes binding on the cable of the existing systems.
3. Trolley Bow End
   a. No existing system works with trolleys that hang from the bottom of the track. This allows for easy clean out of the track.
   b. The trolleys consist of preferably four bearing wheels that allows the bows to slide easily without binding.
   c. Existing systems experience bow tilting because of the rise in the middle of the bows. Tilting causes binding on the cable and tears the tarp.
   d. Trolleys cannot bind even when the track is dented. Also track segments are easily replaced.
4. Track location
   a. Tracks can be located anywhere on the side of the trailer top to bottom. It does not have to be located at the top of the side rail.
5. Heaped load clearance
   a. All existing systems are limited to 18" rise bows
   b. The present invention bows can rise 30" or more.
   c. Most trailers heap their loads not allowing the 18" rise bows to clear the load.
   d. Also many trailers carry demolition material, large pieces of concrete or boulders that lay up against the side rail, blocking the bows from sliding. The present invention bows would still clear.
   e. All existing systems, except the present invention, must have the bows ride on the side and/or top rail.
6. Bow Storage
   a. Storing bows out of the way of loading is always a problem with existing systems.
   b. The present invention can actually store all bows in front of the trailer and ON SIDE DUMPS THEY CAN STORE IN THE FRONT OR IN THE BACK, LEAVING THE CARGO AREA TOTALLY CLEAR.
   c. The bow storage area on end dumps is minimized because the present invention uses less bows than existing systems.
   d. NO OTHER SYSTEM ALLOWS THE TARP AND BOWS TO BE STORED IN THE REAR OF THE DUMP BODY.
7. High Lift Gates
   a. Many rock trailers have high lift gates and lift cylinders at the rear that must be cleared in order to cover the entire load. Normal bows will not clear these obstacles. The only way to have existing systems go over is to have the bow ride only on the cable going straight up and then over. This causes binding on the cable and is not very stable.
   b. The present invention bows easily clear this type of trailer.
8. The present invention bows can be designed and built for any configuration.

BRIEF DESCRIPTION OF THE DRAWINGS

FIG. 8 is a left side plan view of the trolley shown in FIG. 6 with the addition of a cable lock used on the lead trolley.

FIG. 9 is a top perspective view of the track the trolley travels in.

FIG. 10 is a top perspective view of two track segments joined by a bracket.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DESCRIPTION OF THE PREFERRED EMBODIMENT

Figure 1:
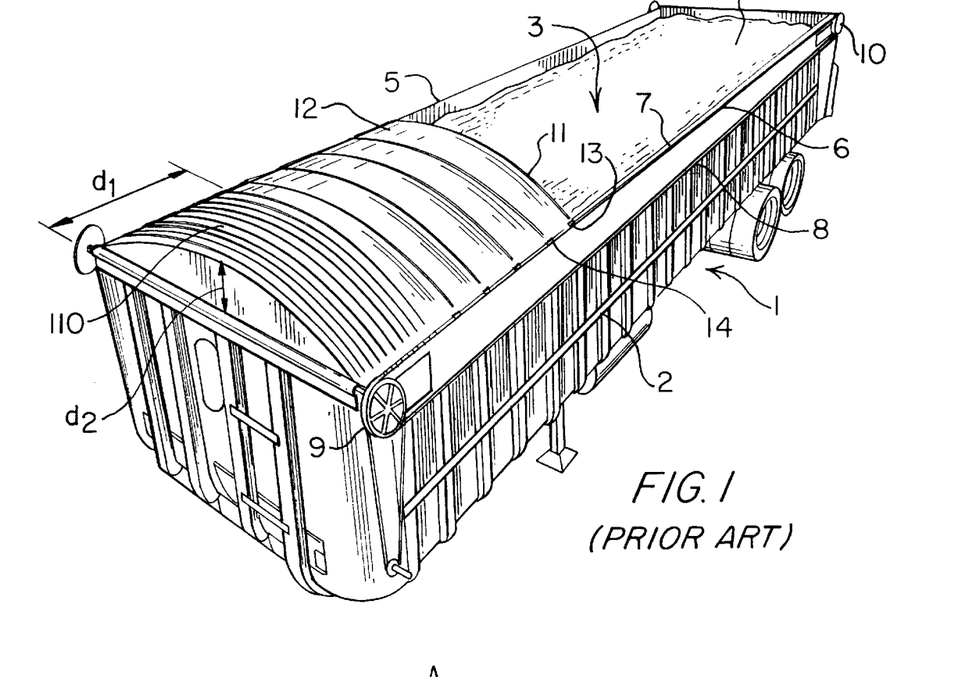
FIG. 1 (prior art) is a top perspective view of an end dump trailer having a conventional bows and tarp cover.

Referring first to FIG. 1 an end dump trailer 1 has a dump body 2 with an open top 3. When in motion the body 4 must be covered by the tarp 12, which is supported by a plurality of bows 11. For loading the dump body the bows 11 are cranked forward to store together in cluster 110 which takes up a distance $d_1$ of useable top area where $d_1$ is at least two feet. Pulleys 9,10 support the continuous cable 7,8. Bow end 13 is locked to the upper cable segment 7 in order to pull or push the other bow ends 14 when the pulleys 9,10 are cranked. Identical counterparts to 13,14 (not shown) exist on the right edge 5 of the dump body, the left edge 6 is shown in detail in FIG. 2.

Figure 2:
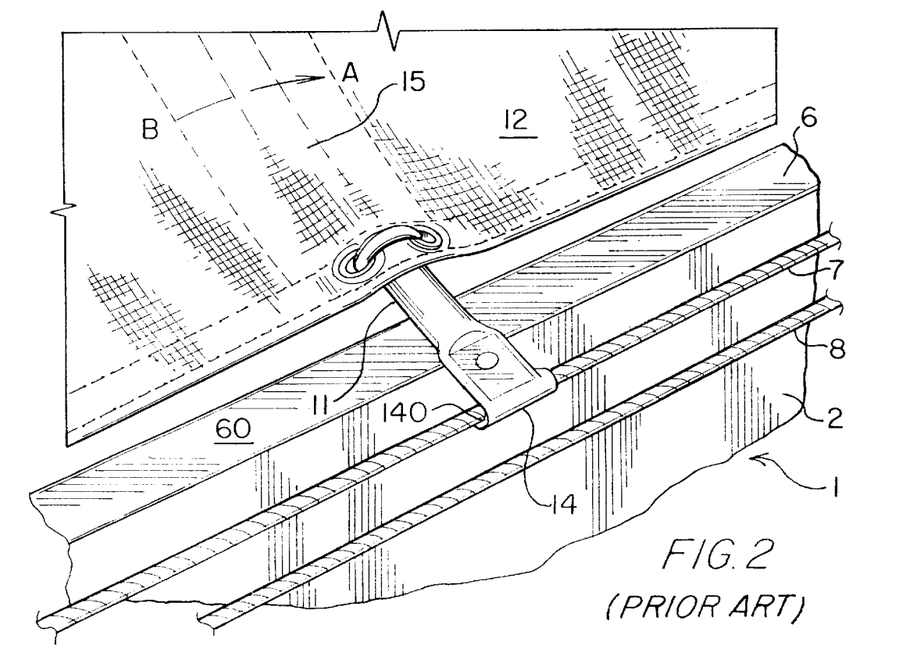
FIG. 2 (prior art) is a close up of the bow end cable support and transport cable shown in FIG. 1.

FIG. 2 shows the bow mounted in the tarp 12 via the slot 15. The bow end 14 slides along the left edge 6 as it is pulled by the tarp 12. The cable 7 acts as a guide for the guide collar 140 of the bow end 14. The cable 7 also acts as a structural support for the weight of the bows 11 and tarp 12. During use the bow 11 twists in directions A,B which causes the cable 7 to bind in the guide collar 140. When the cable 7 binds the tarp 12 is stressed and wears and rips. Top edge 6 needs to be protected by an anti-friction strip 60, which also rips and requires maintenance. Since the bows can only be supported along the top edges 5,6 by a flexible cable 7, the maximum height $d_2$ of the bows 11 above the top edges 5,6 is 18 inches. This is not high enough for rocks projecting upwards and/or fully loaded dirt loads.

Figure 3:
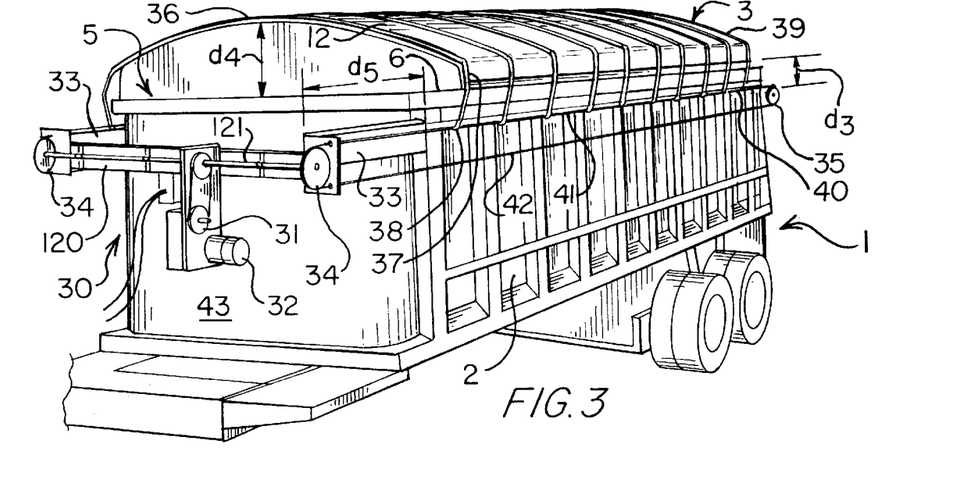
FIG. 3 is a front perspective view of an end dump trailer having the preferred embodiment bow system installed thereon.

Referring next to FIG. 3 the end dump trailer 1 has been outfitted with the preferred embodiment bow system 30. The bow system 30 stores all (or a portion of) the bows 36 forward of the dump body 2 on rack 33. The rack 33 extends forward of the front wall 43 a distance $d_5$ adequate to store all (or a portion of) the bows 36. Since dump bodies vary in length so do the number of bows 36 and so does $d_5$ stored in a cargo area, and $d_5$ also varies with the number of bows. The rack 33 has crossbar 120, which supports an axle 121 for the pulleys 34. Pulleys 34,35 (identical for both the left and right sides) support a continuous cable 42, which can be powered by a manual crank at drive 31 or installed on the front side of the dump body or an electric motor 32. The hand crank mechanism or the electric mechanism can be installed in various locations. The continuous cable 42 is only a drive cable, not a support cable. The bows 36 have a side bow portion 37, which connects to the end bow 38. The end bow 38 has a trolley, which is supported by a track 41, which extends the length of the dump body plus along rack 33. A key improvement over the prior art is that the bow does not ride on or touch the left or right edges 5,6. The track 41 is shown mounted a distance $d_3$=one foot below the left edge 6. However, the truck owner can customize his system and mount the track 41 at C anywhere along the side just by lengthening the side bow portions 37 and the height of the rack 33. The height $d_4$ can reach 30 inches or more, because of the stability of the bow 36 in the truck 41. The drive cable 42 requires that the bow 39 furthest from the crank 31 have a bow end 40 that is locked to the cable 42 in order to pull/push the other bows 36.

Figure 4:
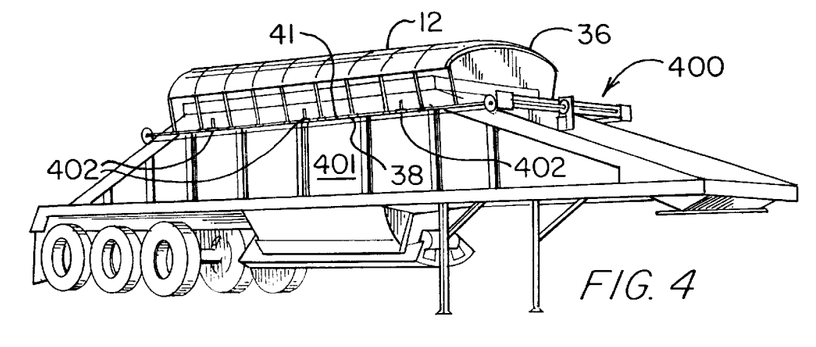
FIG. 4 is a side perspective view of a belly dumper having the preferred embodiment bow system installed thereon.
Figure 13:
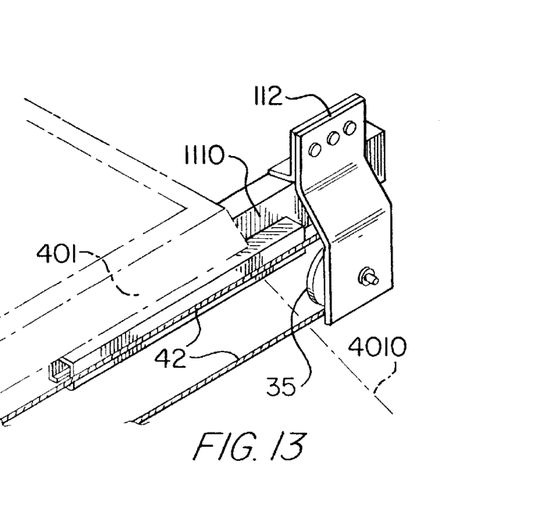
FIG. 13 is a close up of the back end of the belly dumper shown in FIG. 4.
Figure 14:
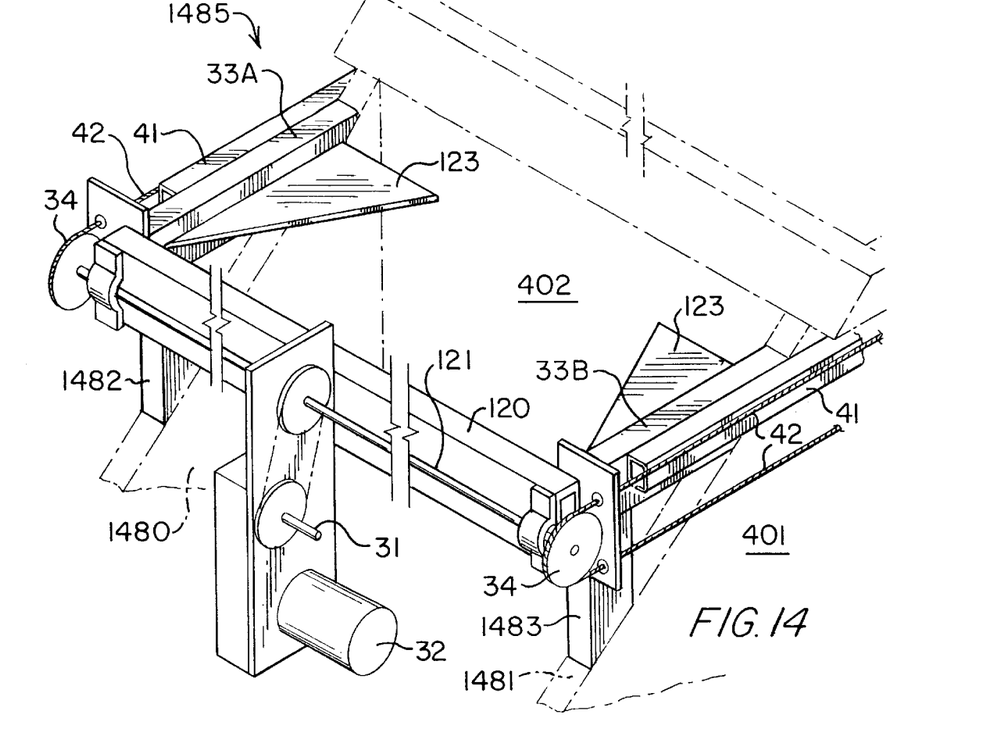
FIG. 14 is a close up of the front end of the belly dumper shown in FIG. 4.

In FIG. 4 the equivalent bow system 400 is shown mounted on a belly dump body 401. Only minor mounting bracket differences exist to accommodate the different dump body shapes, which are shown in FIGS. 13,14. In all of the track systems track segments are ideally about seven feet long and joined by mounting collars 402 shown in detail in FIG. 10.

Figure 5:
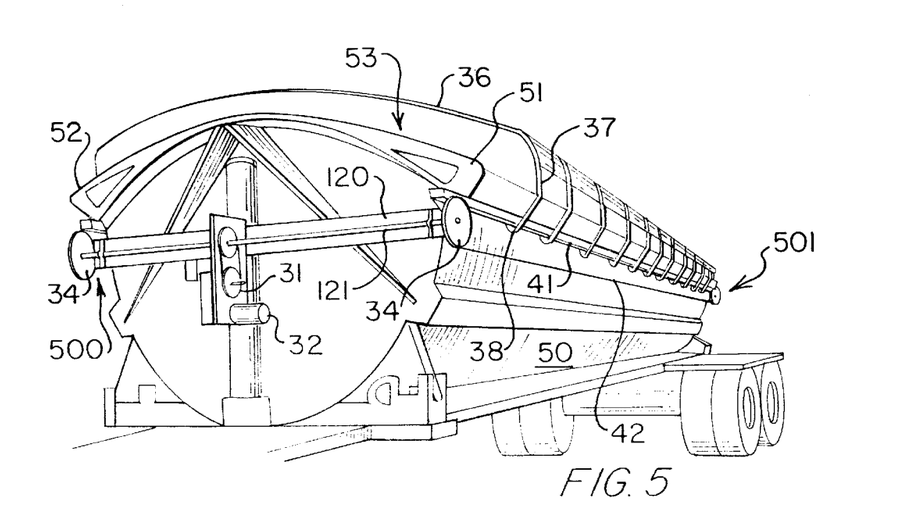
FIG. 5 is a front perspective view of a side dumper having the preferred embodiment bow system installed thereon.
Figure 18:
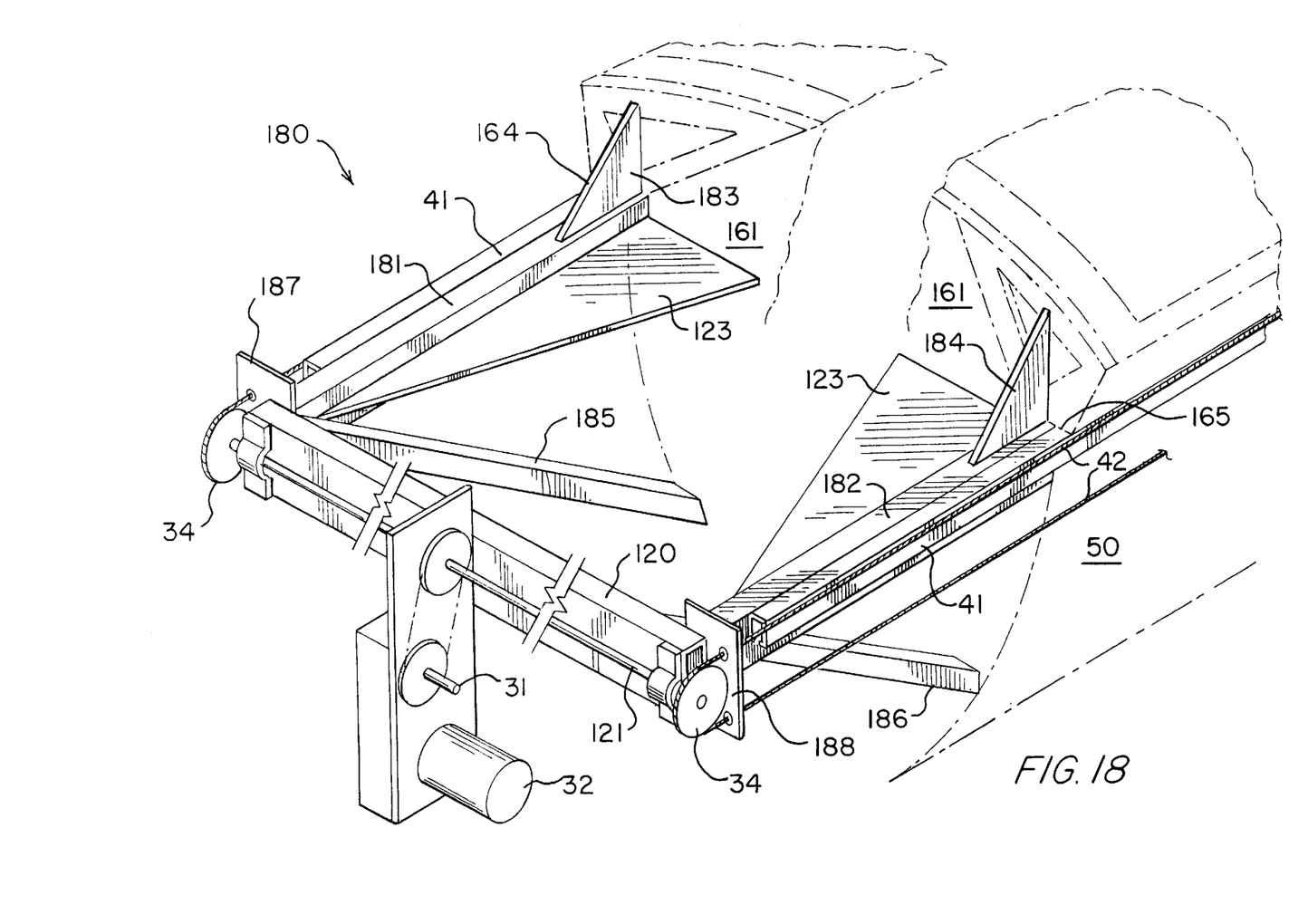
FIG. 18 is a top perspective view of the front side of a side dumper body with a storage rack in front.

Referring next to FIG. 5 a side dump body 50 is shown which can dump out of the left side edge 51 or the right side edge 52. For side dumpers the owner can choose for his bow system 500 to store the bows 36 either in the rear as shown or in the front of the dump body as shown in FIG. 18. The rear storage rack 501 can be seen in FIG. 15. The bow system 500 is equivalent to systems 30 and 400. Clearly for side dumpers the tarp 12 and bows 36 must be stored out of the way of the top 53 or the dirt will spill off a top edge 51 or 52 and destroy the tarp 12 and bows 36.

Figure 6:
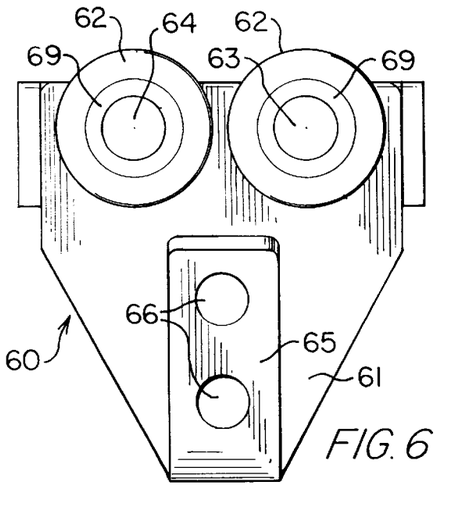
FIG. 6 is a front plan view of the trolley used in FIGS. 3,4,5.
Figure 7:
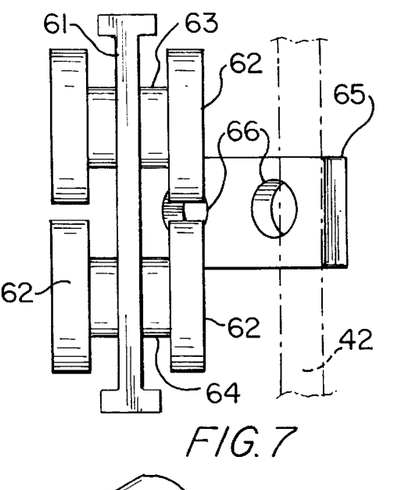
FIG. 7 is a top plan view of the trolley shown in FIG. 6.
Figures 8, 9, 10:
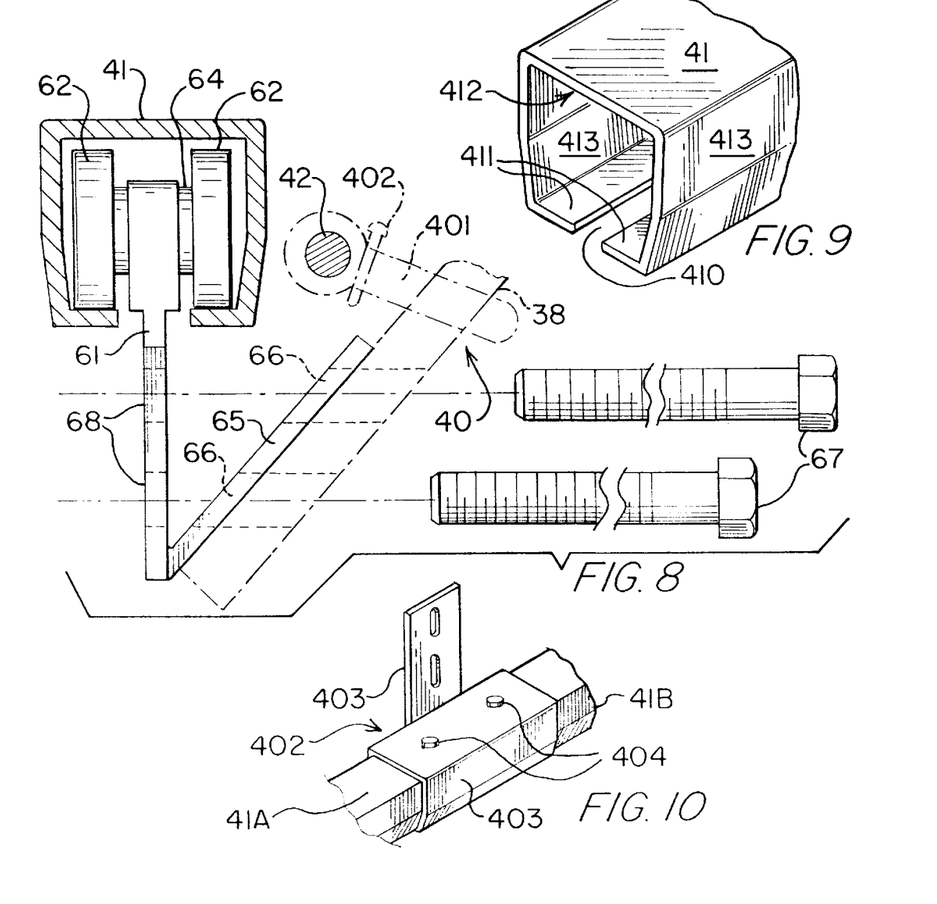

Referring next to FIGS. 6, 7, 8 the trolley 60 supports the bow ends 38 of FIGS. 3, 4, 5. A vertical body 61 has two axles 63,64 which support wheels 62 via ball bearings 69. Rising bracket 65 has mounting holes 66 which align with mounting holes 68 for receiving bolts 67 (nuts are not shown) which connect the bow end 38 to the trolley 60 bow ends be attached on the inside or outside of rising bracket 65 with bolts or U-bolts or other features. The drive cable 42 merely passes near the trolley 60 as shown in FIG. 7 except for the bow end 40 which is furthest from the crank 31 in FIG. 1. FIG. 8 shows the bow end 40 having a locking bolt 401 connecting the bow 39 to the drive cable 42, wherein lock bolt 402 is tightened at a desired location on the drive cable 42. Bow may be connected in various ways to the end bow end. All other bows do not need to be connected to the cable at all.

Referring next to FIG. 9 the track 41 has an open slot 410 to allow easy clean out as with an air hose or water nozzle. Dump trucks carry dirt, and dirt gets everywhere. The support surfaces 411 support the weight of the bows and tarp via wheels 62. In a wind which could lift the tarp, the top surface 412 holds the wheels 62 down. The side walls 413 keep the wheels 62 in the track 41.

Referring next to FIG. 10 the track 41 can be seen to be in segments 41A,41B which are nominally seven feet segments, but can be any length. The mounting bracket 402 has a vertical tab 403 to bolt to the truck body and a collar 403 to support the track segments 41A,41B. Bolts 404 help secure the track segments 41A,41B, but are not necessary. In use the track segments can be hit by a loader shovel to the extent the trolley 60 cannot pass. The mounting bracket 402 keeps maintenance costs low and allows the replacement track to be easily installed.

Figure 11:
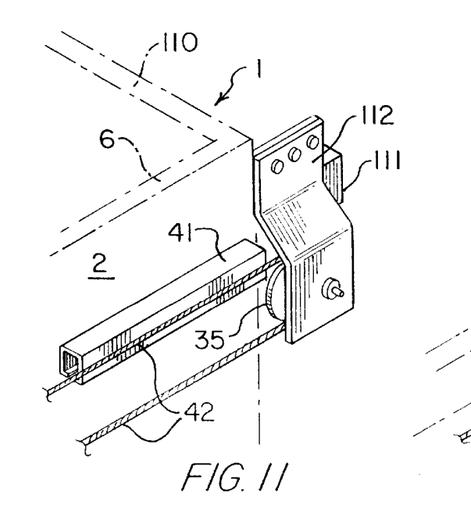
FIG. 11 is a close up of the back end of the end dump body shown in FIG. 3.

Referring next to FIG. 11 the rear of the end dump trailer 1 of FIG. 1 is shown to have the drive cable 42 external to the track 41. The pulley 35 must extend behind the dump body rear panel 110 to allow the bows to fully cover the open top 3. Therefore, a strut 111 is preferably fastened to the dump body 2, and the bracket 112 is fastened to the strut 111. Thus, pulley 35 is securely fastened to the dump body 2 with drive cable 42 being adequately tensioned.

Figure 12:
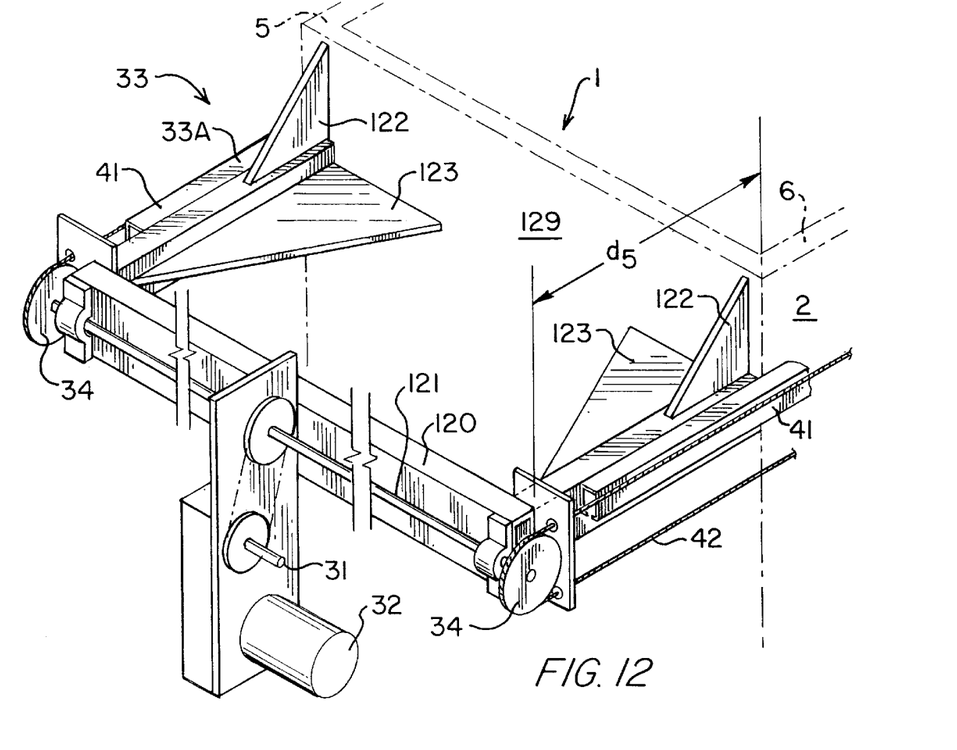
FIG. 12 is a close up of the front end of the end dump body shown in FIG. 3.

Referring next to FIG. 12 the front panel 121 of the end dump trailer 1 of FIG. 1 is shown to support the rack 33. The rack 33 is a U shaped assembly having components left rack 33B, right rack arm 33A, crossbar 120 and fastened mounting plates 122,123. Configuration can differ depending on the different types of trailer bodies. All or part of the bows can store in area $d_5$.

Referring next to FIG. 13 the back of the belly dumper 400 of FIG. 4 is shown to have the same type of pulley support as the end dumper shown in FIG. 11. However, a longer strut 1110 may be needed to prevent the bracket 112 from interfering with the left rear edge 4010 of the dump body 401.

Referring next to FIG. 14 the front of the belly dumper 400 of FIG. 4 is shown to have a front panel 402 and left front support 1481 and right front support 1480. The storage rack 1485 is equivalent to the rack 33 shown in FIG. 12. The key difference is the addition of vertical struts 1482,1483 to support the rack arms 33A, 33B.

Figure 15:
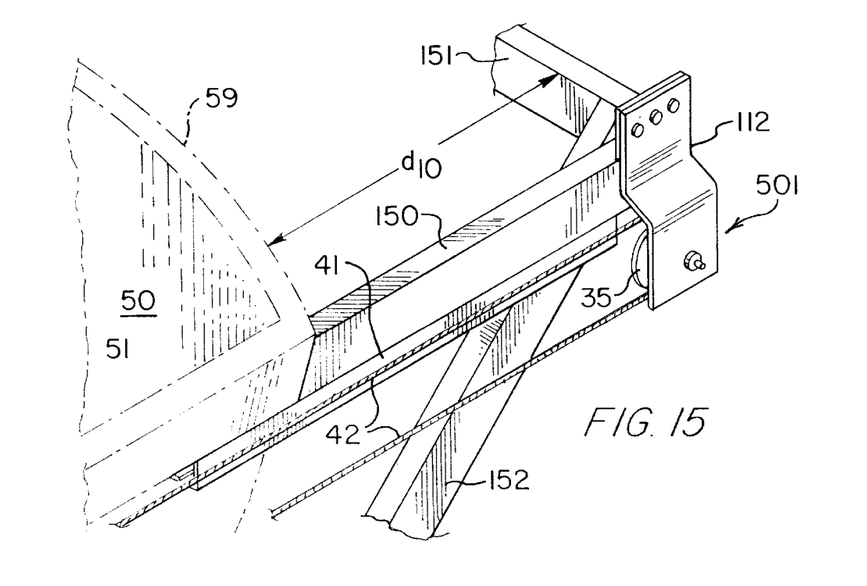
FIG. 15 is a close up of the back end of the side dumper shown in FIG. 5.
Figure 16:
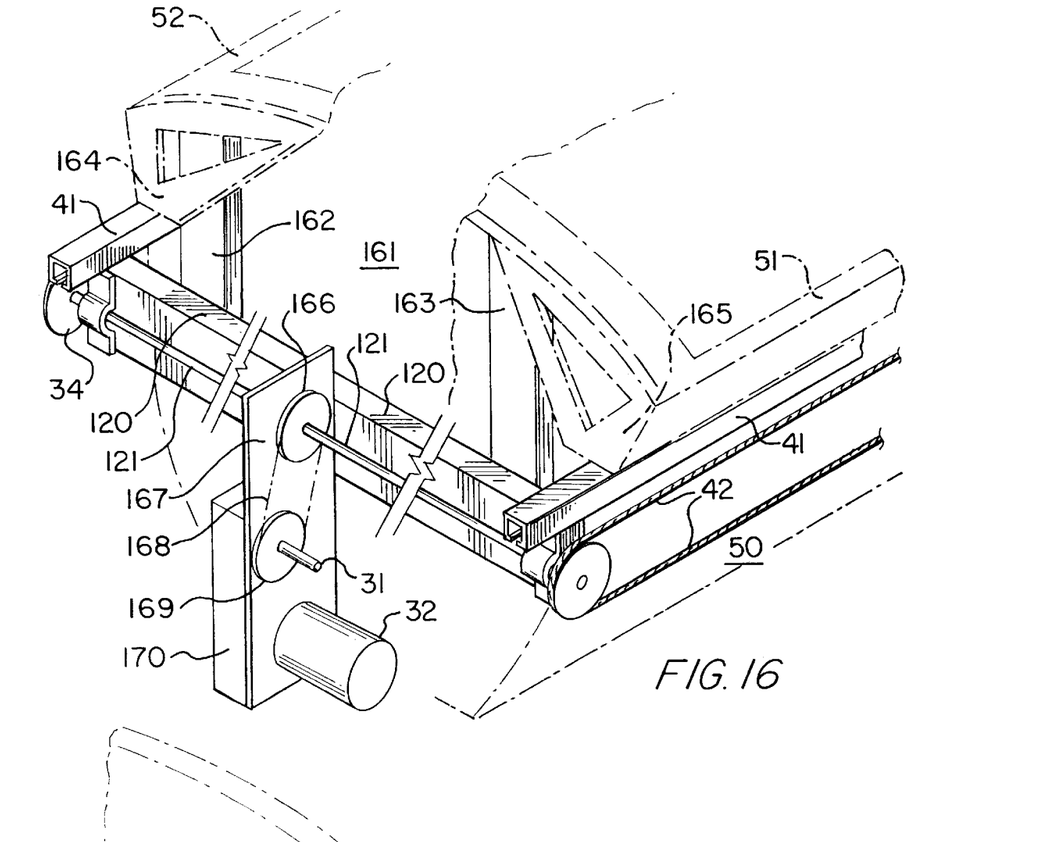
FIG. 16 is a close up of the front end of the side dumper shown in FIG. 5.

Referring next to FIGS. 15,16 details of the side dump body 50 of FIG. 5 are shown. FIG. 15 shows the storage rack 501 to be in the rear of the dump body 50.

Referring next to FIG. 15 the rack arm 150 needs to be a length $d_{10}$ sufficient to store all the bows, usually at least two feet. A vertical strut 152 and a horizontal bar 151 in combination with the right rack arm and right vertical strut (not shown) form a stable storage rack 501. Bracket 112 can be installed just behind the dump body on the inside of the rack arm 150, since only the lead bow is actually connected to the cable.

Referring next to FIG. 16 the front of the side dump body 50, FIG. 5, is shown to have a front panel 161 with vertical braces 162,163. These vertical braces 162,163 directly support the crossbar 120 as well as the tracks 41. The left edge 51 has ledge 165, which can support as well as protect the track 41. The right edge 52 has the same edge 164 to support the track 41. These ledges will vary in size and shape with different dump bodies. All of the drive cable systems are equivalent. The axle 121 has a drive pulley or sprocket 166, which is powered by the belt or chain or direct drive 168. The mounting plate 167 holds all the drive train elements of an electric system. A manual crank can be mounted at 31 (or other locations) to crank the pulley or sprocket 169. A motor 32 powers the transmission 170 also to power the pulley or sprocket 169.

Figure 17:
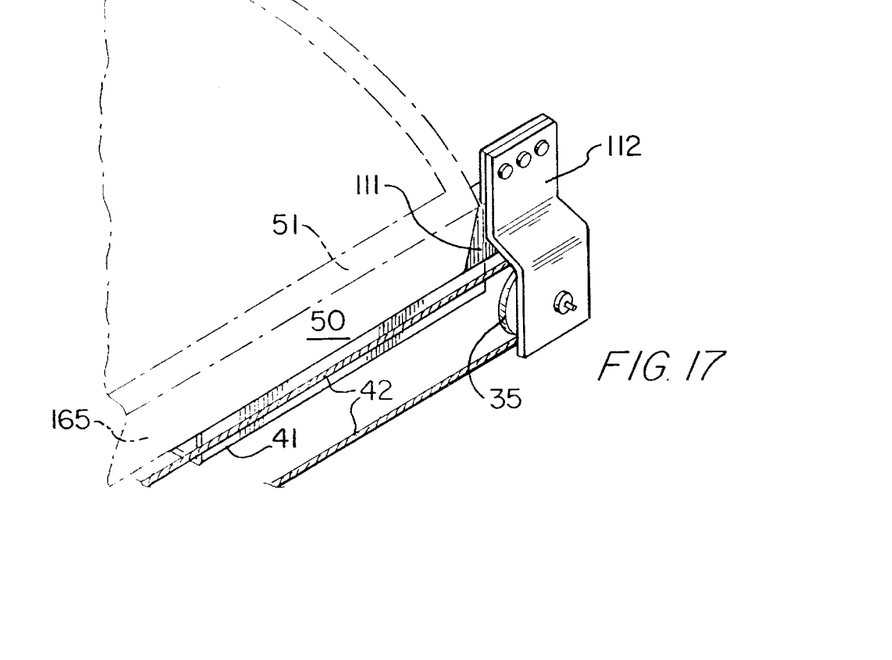
FIG. 17 is a top perspective view of a backside of a side dump body with the storage rack in the front as shown in FIG. 18.

Referring next to FIG. 17 when the side dump body 50 has a front storage rack, then the rear cable mount assembly is the same as the assembly for the end dump body shown in FIG. 11, except the track 41 is mounted under the ledge 165.

Referring next to FIG. 18 the side dump body 50 has been installed with a front storage rack 180. Rack arms 181,182 are supported by mounting plates 123,183,184. Struts 185, 186 supply the vertical support. Bumper plates 187,188 prevent the trolleys from falling out of the tracks 41. Different configurations can be used for different dump body styles.

Figure 19:
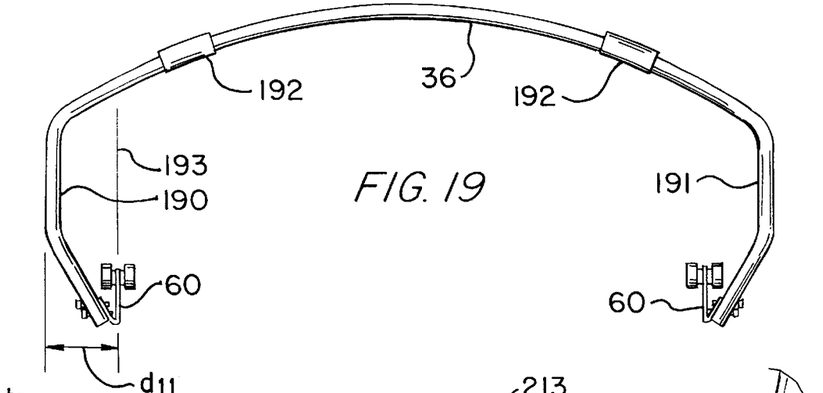
FIG. 19 is a front plan view of a modular bow used in the systems shown in FIGS. 3,4,5.

Referring next to FIG. 19 the bow 36 has splicers 192, which connect the side bow segments 190,191 to the main bow 36. Additional segments can be added to 190 and 191 to raise the bow height. Line 193 represents a dump body side wall which would support the track. Therefore, distance $d_{11}$ which is supplied by side bow segment 190 and 191, will vary based upon different dump body and bow designs.

Figure 20:
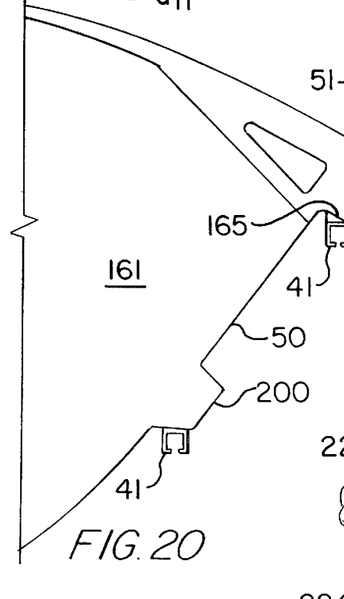
FIG. 20 is a front plan view of a side dump body having the track mounted in either of two locations.

Referring next to FIG. 20 a side dump body 50 may have more then one mounting option for the track 41. Either the ledge 165 or the horizontal bar 200 will suffice.

Figure 21:
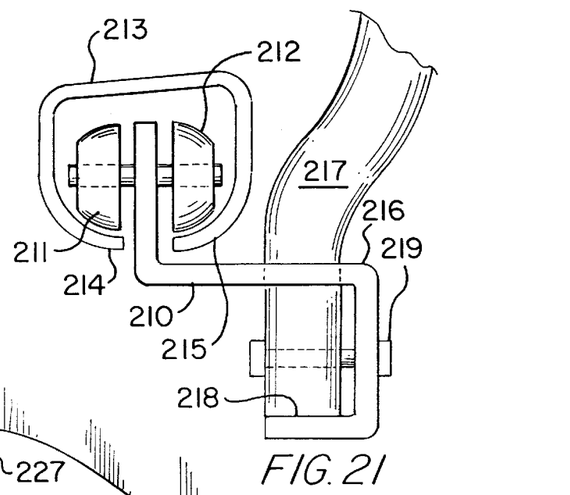
FIG. 21 is a front plan view of an alternate embodiment of a track and trolley system.

Referring next to FIG. 21 an alternate embodiment trolley 210 is shown having two or four curved wheels 211,212. The track 213 has matching curved surfaces 214,215. The horizontal support bar 216 has a hole that receives bow end 217 which then rests on ledge 218. A fastener or bolt and nut 219 locks the bow end assembly together. The support bar 216 can be configured in different ways to allow bow end connection.

Figure 22:
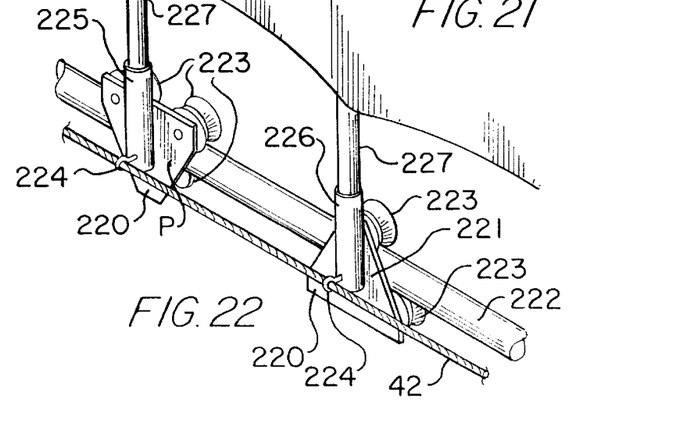
FIG. 22 is a top perspective view of an alternate embodiment three wheel trolley system.
Figure 23:
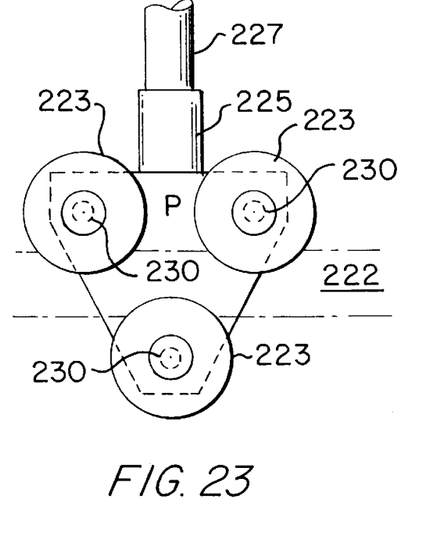
FIG. 23 is a front plan view of the trolley 220 shown in FIG. 22.
Figure 24:
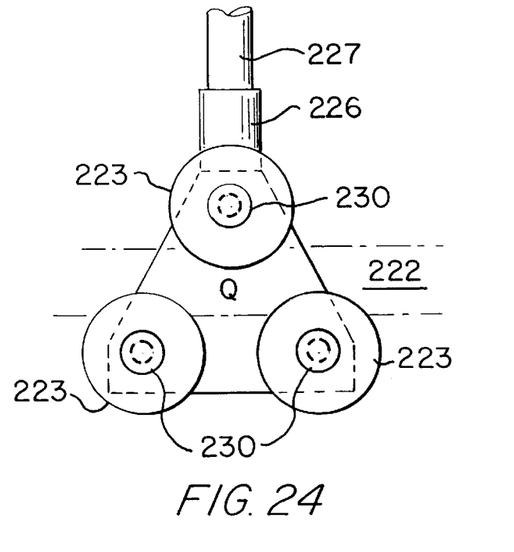
FIG. 24 is a front plan view of the trolley 221 shown in FIG. 22.

Referring next to FIG. 22 an alternative embodiment trolley 220,221 is shown. The track 222 is essentially a round pipe or rod with trolley wheels 223 riding on the outer top and outer bottom surfaces. The triangle bases P,Q may be staggered two wheels up then two wheels down in order to provide maximum stability for upward pressures due to wind as well as to normal weight bearing pressures of the tarp and bows. The guides 224 merely prevent the drive cable 42 from slapping the side of the dump body. Once again the farthest trolley from the crank will have guide 224 locked to the cable 42. Collars 225,226 receive the bow ends 227. In FIGS. 23,24 it can be seen that axles 230 support the wheels 223. The track 222 is essentially pinched between the opposing sets of wheels (2 wheels vs. 1 wheel).

Figure 25:
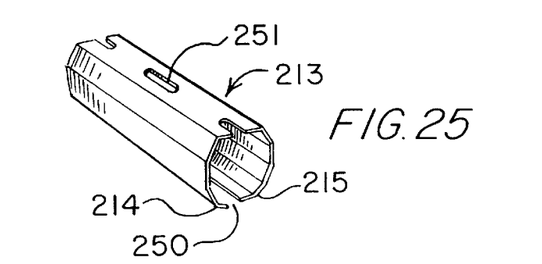
FIG. 25 is a top perspective view of the track shown in FIG. 21.
Figure 26:
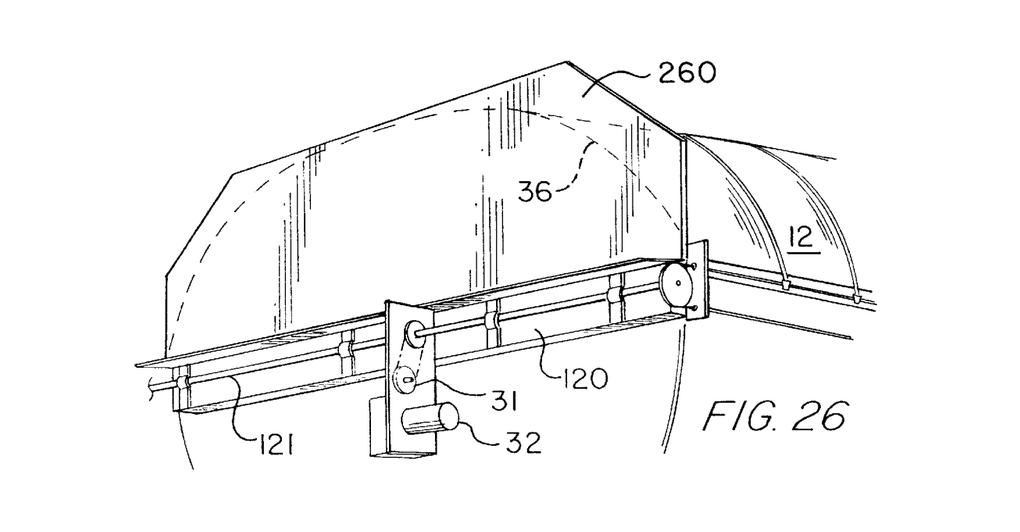
FIG. 26 is a front perspective view of a windscreen.

Referring next to FIG. 25 the track 213 of FIG. 21 is shown to have a slot 250 and mounting holes 251. Referring next to FIG. 26 an optional windscreen 260 is mounted to the front of any dump body to rise above the bows 36 and reduce wear and flapping of the tarp 12.

Figure 27:
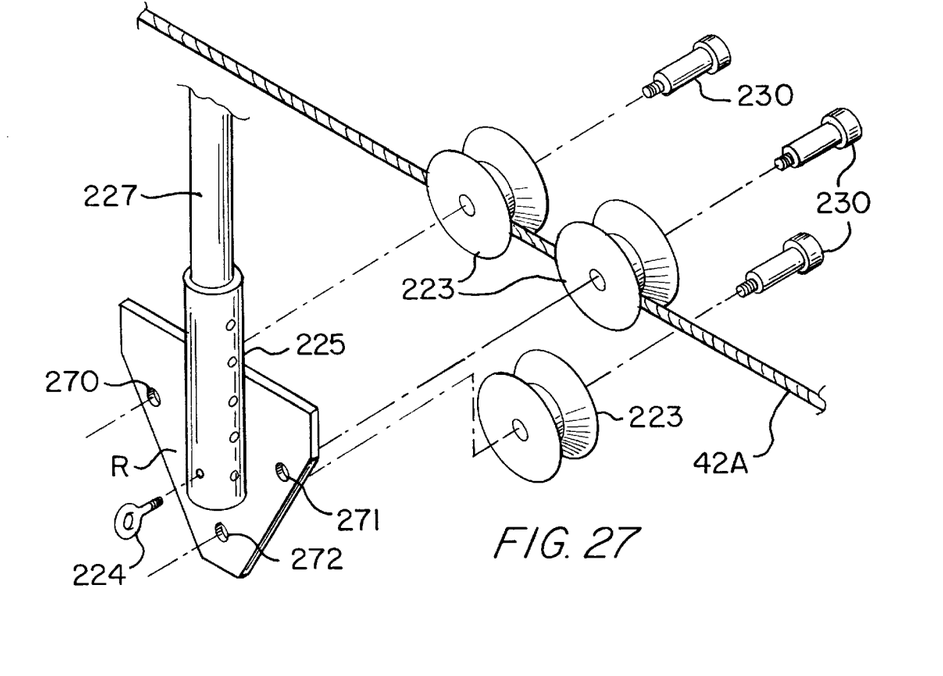
FIG. 27 is a top perspective view of an alternate embodiment cable/trolley system.

Referring next to FIG. 27 an alternate embodiment of the track system of FIGS. 22,23,24 is shown to have a support cable 42A in place of the track 222. The support cable 42A is stationary and drawn taught via known methods of using tightening bolts affixed to end plates or the like. It can be seen that the axles 230 are threaded bolts which screw into the triangle base R in holes 270,271 and 272. Holes 270,271 are lower than their counterparts on triangle base P in FIG. 23 because the support cable is nominally ⅜ inch thick rather than the track 222 which is nominally one inch thick.

Figure 28:
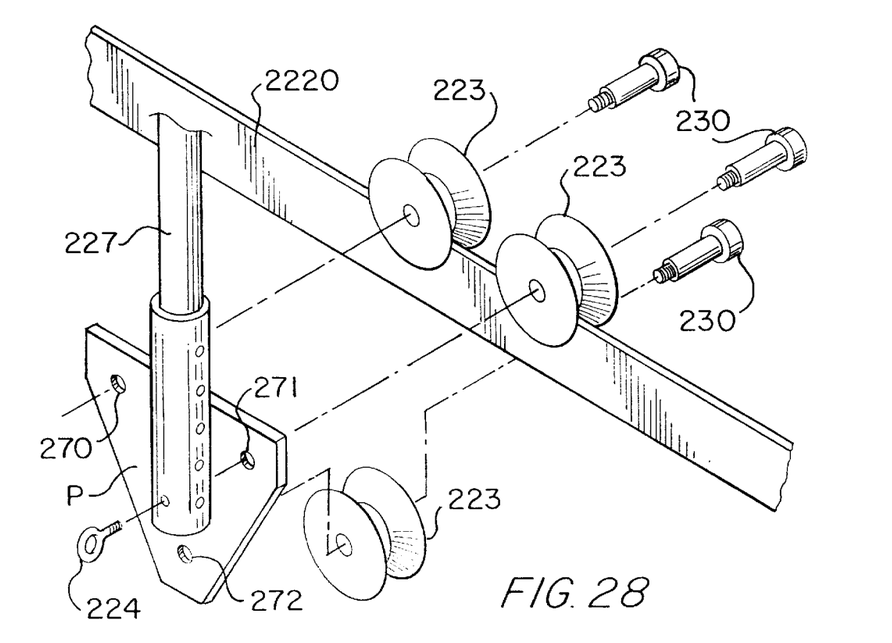
FIG. 28 is a top perspective view of an alternate embodiment trolley rail system.

Referring next to FIG. 28 yet another alternate embodiment of a tarp system equivalent to that shown in FIGS. 22,23,24 is shown to have the same triangle base P, but a trolley rail 2220 which is nominally 1"×¼" inch steel is used in place of a tubular track.

Figure 29:
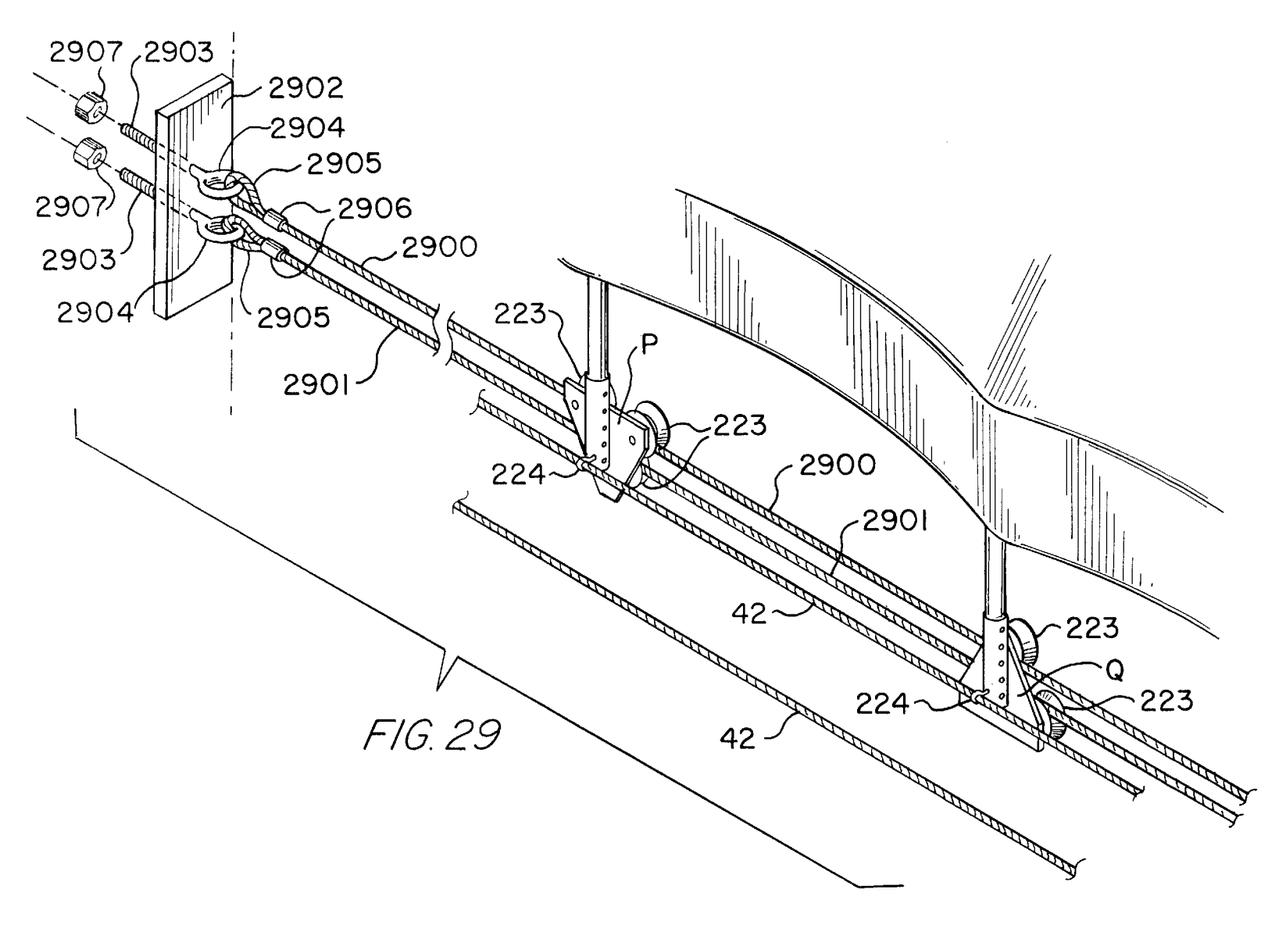
FIG. 29 is a top perspective view of a dual stationary support cable and trolley system.

Referring next to FIG. 29 yet another alternate embodiment of a trolley system equivalent to FIGS. 22,23,24 is shown. A pair of stationary support cables 2900, 2901 replace the tubular track 222 of FIGS. 22,23,24. The truck owner can choose either the track systems or cable support systems, wherein the cable support systems (FIGS. 27,29) are not as easily damaged by a front end loader slamming against the side of the dump body. The stationary cables 2900,2901 may be tightened by a bolt 2903 having a loop 2904. The cable 2900 is looped through the loop 2904 and locked with a collar 2906. A brace 2902 supports the bolt 2903. A nut 2907 tightens the cable 2900. The cable loop 2905 is formed by the collar 2906.

Figure 30:
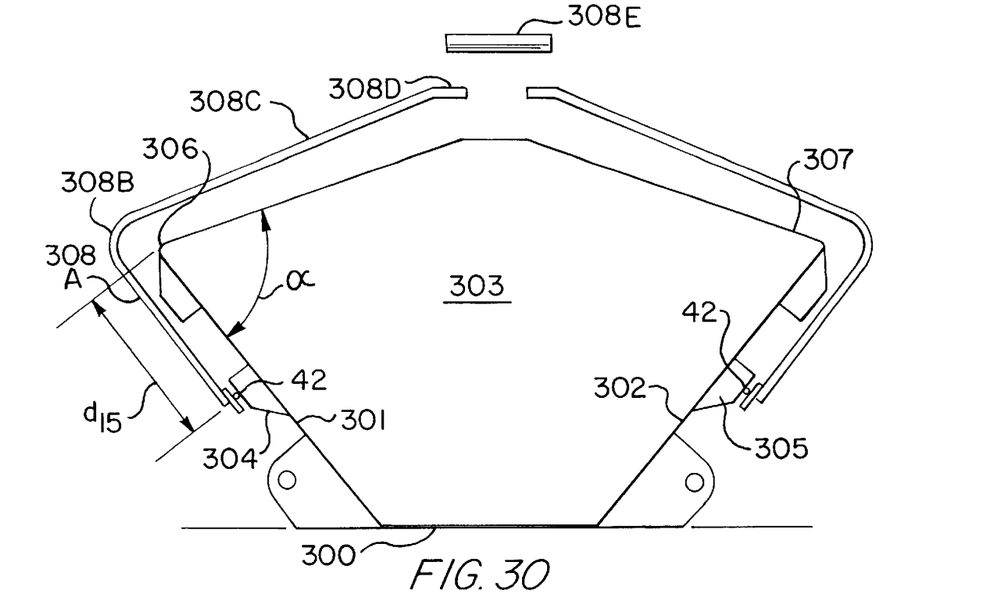
FIG. 30 is a front plan view of a side dump bow embodiment.

Referring next to FIG. 30 a typical bow configuration for a side dumper is shown. A dump body 300 has sides 301,302. The front panel 303 creates an angle α=69° (this degree may vary) with the sides 301,302. Distance $d_{15}$ can be any length to the track 42. In this rig the horizontal beams 304,305 are more than a foot below the top edges 306,307. The bow 308 has segments 308A (various lengths), 308B (various lengths), 308C (various lengths), 308D (various lengths), and joiner collar 308E (various lengths).

Figure 31:
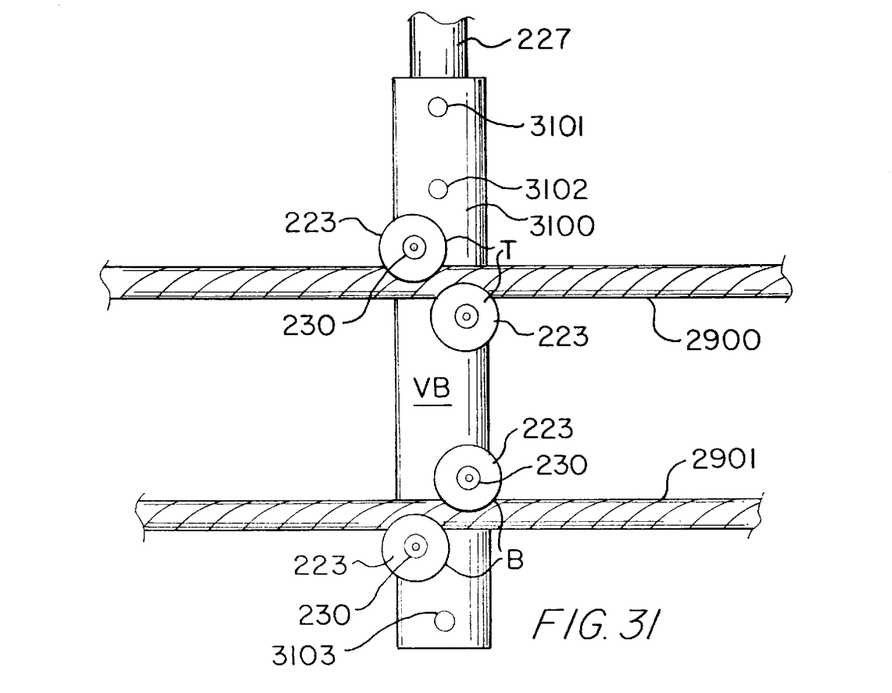
FIG. 31 is a front plan view of an alternate embodiment four wheel trolley for a dual stationary support cable system.

Referring next to FIG. 31 yet another trolley 3100 is shown to ride on stationary cables 2900,2901 shown in FIG. 29. The wheels 223 are arranged in staggered pairs, set T and set B, to pinch their respective cable. The trolley 3100 is made essentially of a vertical base VB having bolts 3101, 3102, 3103 to secure the end bow 227.

Although the present invention has been described with reference to preferred embodiments, numerous modifications and variations can be made and still the result will come within the scope of the invention. No limitation with respect to the specific embodiments disclosed herein is intended or should be inferred.

What is claimed is:

1. A cover in combination with a belly and a side dump body each having an open top, said cover comprising:
    a plurality of bows supporting a tarp spanning the open top in a closed mode;
    each of said bows having a left and a right bow end supported by a left and a right horizontal support;
    said left and right horizontal supports each having a sliding engagement with said plurality of bow ends to enable said bows to slide along a longitudinal axis of said dump body to an open mode; and
    a storage rack extending from a back end of the dump body to receive at least one of the plurality of bows in the closed mode.

2. The cover of claim 1, wherein the bows and the bow ends are fully supported by the left and the right horizontal supports so as not to touch the dumps body.

3. The cover of claim 2, wherein the left and the right horizontal support each comprise a track, and the low ends each further comprise a trolley riding on the track.

4. The cover of claim 3, wherein the track is a hollow rectangular tube, and the trolley has base supporting four wheels, which ride in a lower surface of the dump body, and the base supports an arm which fastens to a respective bow end.

5. The cover of claim 4, wherein the lower surface of the track has a slot.

6. The cover of claim 3, wherein the track further comprises segments joined by a mounting bracket.

7. The cover of claim 1 further comprising a cable drive assembly having a left and a right cable to push/pull a distal bow from a crank end of the assembly, said distal bow pushing/pulling via the tarp the plurality of bows.

8. The cover of claim 7 further comprising a motor to power the crank end.

9. The cover of claim 1, wherein the storage rack further comprises a left and a right strut extending forward of the dump body and a crossbar connected to the left and the right strut.

10. The cover of claim 9, wherein the crossbar further comprises the drive cable assembly for sliding the plurality of bows to the open and the closed mode.

11. The cover of claim 10, wherein a rear end of the dump body has a left and a right pulley to support a left and a right drive cable of the drive cable assembly.

12. The cover of claim 2, wherein each of said plurality of bows further comprises a slide bow segment projecting outward from the dump body.

13. The cover of claim 1, wherein the left and right horizontal supports are each mounted at anywhere below a top edge of the dump body.

14. The cover of claim 12, wherein each of said plurality of bows further comprises segments joined by splicers.

15. The cover of claim 3, wherein the track is a hollow semi-rectangular tube having a pair of curved bottom segments. The trolley has a base supporting a pair of wheels curved to conform to the curvature of the curved bottom segments, and the base supports an arm which fastens to a respective bow end.

16. The cover of claim 3, wherein the track is a tubular rail, and the trolley is a vertical mounting plate supporting a first set of at least two wheels which oppose a second set of at least one wheel, said wheels riding on a top and a bottom segment of the tubular rail, and the vertical mounting plate supports a collar to receive a bow end.

17. The cover of claim 3, wherein the track is a flat trolley rail, and the trolley is a vertical mounting plate supporting a first set of at least two wheels which oppose a second set of at least one wheel, said wheels riding on a top and a bottom edge of the flat trolley rail, and the vertical mounting plate supports a collar to receive a bow end.

18. The cover of claim 2, wherein the left and the right horizontal support each comprise a stationary cable, and the bow ends each further comprise a trolley riding on the stationary cable.

19. The cover of claim 18, wherein the trolley is a vertical mounting plate supporting a first set of at least two wheels which oppose a second set of at least one wheel, said wheels riding on a top and a bottom surface of the cable, and the vertical mounting plate supports a collar to receive a bow end.

20. The cover of claim 2, wherein the left and the right horizontal support each comprise a pair of stationary, parallel cables, and the bow ends each further comprise a trolley riding on the pair of stationary cables.

21. The cover of claim 20, wherein the trolley is a vertical mounting plate supporting a first set of at least two wheels which oppose a second set of at least one wheel, said first set riding on a first member of the pair of cables, said second set riding on a second member of the pair of cables, and the vertical mounting plate supporting a bow end.

22. The cover of claim 2, further comprising a windscreen mounted on a front panel of the dump body, said windscreen rising to a height of at least a height of the plurality of bows.

* * * * *